(12) United States Patent
Zisimopoulos et al.

(10) Patent No.: US 10,694,428 B2
(45) Date of Patent: Jun. 23, 2020

(54) METHOD AND SYSTEM FOR HANDOVER OF VIDEO CALLS FROM A PACKET SWITCHED NETWORK TO A CIRCUIT SWITCHED NETWORK IN A SINGLE RADIO ENVIRONMENT

(75) Inventors: Haris Zisimopoulos, Middlesex (GB); Vaishali Paisal, Bangalore (IN)

(73) Assignee: Samsung Electronics Co., Ltd (KR)

( * ) Notice: Subject to any disclaimer, the term of this patent is extended or adjusted under 35 U.S.C. 154(b) by 910 days.

(21) Appl. No.: 13/696,217

(22) PCT Filed: May 3, 2011

(86) PCT No.: PCT/KR2011/003322
§ 371 (c)(1),
(2), (4) Date: Nov. 5, 2012

(87) PCT Pub. No.: WO2011/139083
PCT Pub. Date: Nov. 10, 2011

(65) Prior Publication Data
US 2013/0063540 A1    Mar. 14, 2013

(30) Foreign Application Priority Data
May 3, 2010   (IN) .......................... 1244/CHE/2010

(51) Int. Cl.
*H04W 36/00* (2009.01)
*H04N 7/14* (2006.01)
(Continued)

(52) U.S. Cl.
CPC ..... *H04W 36/0022* (2013.01); *H04L 65/1083* (2013.01); *H04W 36/14* (2013.01)

(58) Field of Classification Search
CPC .......... H04L 65/1083; H04W 36/0022; H04W 36/14; H04W 36/00; H04N 7/14
See application file for complete search history.

(56) References Cited

U.S. PATENT DOCUMENTS 6,504,828 B1 * 1/2003 Corbett .......................... 370/331
6,999,434 B1 * 2/2006 Agrawal et al. .............. 370/331
(Continued)

OTHER PUBLICATIONS

3GPP_TR23.8xy, "Feasibility Study of Single Radio Video Call Continuity (vSRVCC)", 3GPP TR 23.8xy v0.1.0, Mar. 2010.*
3GPP_23.216, "3rd Generation Partnership Project; Technical Specification Group Services and System Aspects; Single Radio Voice Call Continuity (SRVCC); Stage 2", v9.3.0, Mar. 2010.*
(Continued)

*Primary Examiner* — Noel R Beharry
*Assistant Examiner* — Ruihua Zhang
(74) *Attorney, Agent, or Firm* — The Farrell Law Firm, P.C.

(57) ABSTRACT

A method and system for handover of a video call from a packet switched network to a circuit switched network by a first network entity associated with the packet switched network in a single radio environment is provided. A need to perform a video single radio voice call continuity (vSRVCC) handover from a packet switched network to a circuit switched network is detected during a video call session in the packet switched network. Accordingly, a vSRVCC handover request is transmitted to a second network entity associated with the circuit switched network for performing the vSRVCC handover of the video call session where the vSRVCC handover request includes vSRVCC capabilities of a user equipment (UE) associated with the video call session.

12 Claims, 3 Drawing Sheets

(51) Int. Cl.
*H04W 36/14* (2009.01)
*H04L 29/06* (2006.01)

(56) References Cited

U.S. PATENT DOCUMENTS

| | | | | |
|---|---|---|---|---|
| 8,483,182 | B1* | 7/2013 | Keller et al. | 370/331 |
| 8,957,938 | B2* | 2/2015 | Lei | 348/14.02 |
| 2005/0180338 | A1* | 8/2005 | Pirila et al. | 370/252 |
| 2008/0049725 | A1* | 2/2008 | Rasanen | 370/352 |
| 2008/0137541 | A1 | 6/2008 | Agarwal et al. | |
| 2008/0280612 | A1* | 11/2008 | Bornier et al. | 455/436 |
| 2009/0086742 | A1 | 4/2009 | Ghai et al. | |
| 2010/0040020 | A1* | 2/2010 | Chen | 370/331 |
| 2010/0091732 | A1 | 4/2010 | Roeder et al. | |

OTHER PUBLICATIONS

3GPP_TS23.237, "3rd Generation Partnership Project; Technical Specification Group Services and System Aspects; IP Multimedia Subsystem (IMS) Service Continuity; Stage 2", v10.1.0 Mar. 2010.*
3GPP TS 23.216 V11.5.0 (Jun. 2012), Technical Specification 3rd Generation Partnership Project; Technical Specification Group Services and System Aspects; Single Radio Voice Call Continuity (SRVCC); Stage 2 (Release 11).*
PCT/ISA/237 Written Opinion issued on PCT/KR2011/003322 (pp. 3).
PCT/ISA/210 Search Report issued on PCT/KR2011/003322 (pp. 3).
Samsung, "Stepwise Approach for vSRVCC Handover", S2-101552, 3GPP TSG SA WG2 Meeting #78, Feb. 22-26, 2010, 5 pages.
European Search Report dated May 22, 2017 issued in counterpart application No. 11777564.3-1870, 7 pages.
Huawei, "Discussion on the Impact of the SRVCC", C1-083817, 3GPP TSG CT WG1 Meeting #55bis, Oct. 6-10, 2008, 2 pages.
European Search Report dated Apr. 23, 2019 issued in counterpart application No. 11777564.3-1218, 5 pages.

* cited by examiner

METHOD AND SYSTEM FOR HANDOVER OF VIDEO CALLS FROM A PACKET SWITCHED NETWORK TO A CIRCUIT SWITCHED NETWORK IN A SINGLE RADIO ENVIRONMENT

PRIORITY

This application is a U.S. National Phase entry from and claims priority to International Appl. No. PCT/KR2011/003322, filed May 3, 2011, and also claims priority to Appl. No. 1244/CHE/2010, filed with the Indian Patent Office on May 3, 2012, the contents of each of which are incorporated herein by reference.

BACKGROUND

1. Field of the Invention

The present invention generally relates to wireless communication systems, and more particularly, to handover of video calls from a packet switched network to a circuit switched network in a single radio environment.

2. Description of the Related Art

An SAE/LTE system is a packet switched (PS) system in which voice and video calls are established through a PS domain. Therefore as a "default option", voice calls use the PS domain as packet video-calls and underlying call control protocol is SIP supported through an IP multimedia subsystem (IMS). Recently, there has been a slow migration of users from the SAE/LTE domain from a circuit switched (CS) domain to the LTE packet switched domain. Hence, the LTE system may be deployed in "islands" overlaying parts of the CS domain. This means that if a user makes a video-call over the LTE system, the video-call may not be just subject to an intra-domain handover (i.e., radio-level and intra-network-level handover) but is also likely to be subject to an inter-domain handover from the LTE packet domain to the CS domain due to mobility of the user during the video-call. This leads to the development of a functionality called Single Radio Voice Call Continuity (SRVCC) in the Third Generation Partnership Project (3GPP) technology. SRVCC is a functionality that allows a voice/video call in the LTE packet domain to be moved to the CS domain.

CS video-calls support a feature called "Service change for UDI/RDI fallback" (normally referred to as a service change and unrestricted digital information fallback (SCUDIF)). This service is available to UDI/RDI multimedia calls and allows users to achieve successful call establishment when end-to-end CS multimedia is not possible (fallback to speech) or when signaling of the feature is not possible in the CS network (fallback to preferred service or speech). Furthermore, it allows users to swap between a multimedia service and basic speech during an established call.

Nevertheless, in the case that the call (either voice-call or video-call) has been established in the IMS, there is no negotiation that normally takes place between user equipment (UE) and a mobile service centre (MSC) in order to mutually identify whether both the UE and MSC support the SCUDIF feature; hence it is not possible to use the SCUDIF feature when the UE moves to the CS domain from the PS domain. For example, if a voice/video call has been initiated with the PS network and later handed over to the CS network using an SRVCC, there is no communication that takes place between the UE and the MSC during the call setup time. As a consequence, the UE and the MSC are unaware of each other's SCUDIF capabilities (user-initiated or network-initiated) when the voice/video call is transferred to the CS network.

Further, a delay may be introduced by H.324 when performing the following steps for call setup:
H.223 Multiplexer level detection
Terminal Capability Exchange
Master Slave determination
Open Logical Channels
Multiplexer Table Entries Exchange The procedure typically takes 5~8 seconds. If link quality deteriorates or media configurations between UEs are not well-matched, this delay may increase even further. The delay can be suppressed to as low as a few seconds in limited cases when the acceleration techniques are supported by both UEs and little data is lost during the period. However, the call set up procedure of 3G-324M, outlined above, is likely to occur at cell edges under the SRVCC situations where radio link is unstable.

Given that the period of the current SRVCC handover with voice only is significantly smaller (e.g. in the range of 300-500 ms) if simultaneous transfer of voice and video is performed when a handover from PS-to-CS network with video SRVCC (given that a 64 kbps bearer is established on the UTRAN side and the increased call setup delay of 3G-324M from the negotiation between UEs using H.245 signaling procedures) interruption time might be significantly large, during which a message might be displayed to ask for patience from the user or recently-played video clips might be replayed until newly-decoded scenes become available.

SUMMARY OF THE INVENTION

According to an aspect of the present invention, there is provided a method for performing a handover of a video call from a packet switched network to a circuit switched network by a first network entity associated with the packet switched network in a wireless network environment. The method includes detecting a need to perform a video single radio voice call continuity (vSRVCC) handover from a packet switched network to a circuit switched network during a video call session in the packet switched network, and transmitting a vSRVCC handover request to a second network entity associated with the circuit switched network for performing the vSRVCC handover of the video call session; with the vSRVCC handover request includes vSRVCC capabilities of a user equipment (UE) associated with the video call session.

According to another aspect of the present invention, there is provided a method for performing a handover of a video call from a packet switched network to a circuit switched network by a second network entity associated with the circuit switched network in a wireless network environment. The method includes receiving, from a first network entity associated with the packet switched network, a video single radio voice call continuity (vSRVCC) handover request for performing a vSRVCC handover of a video call session in the packet switched network, wherein the vSRVCC handover request comprises vSRVCC capabilities of a user equipment (UE) associated with the video call session; and performing the vSRVCC handover based on the vSRVCC capabilities of the UE.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
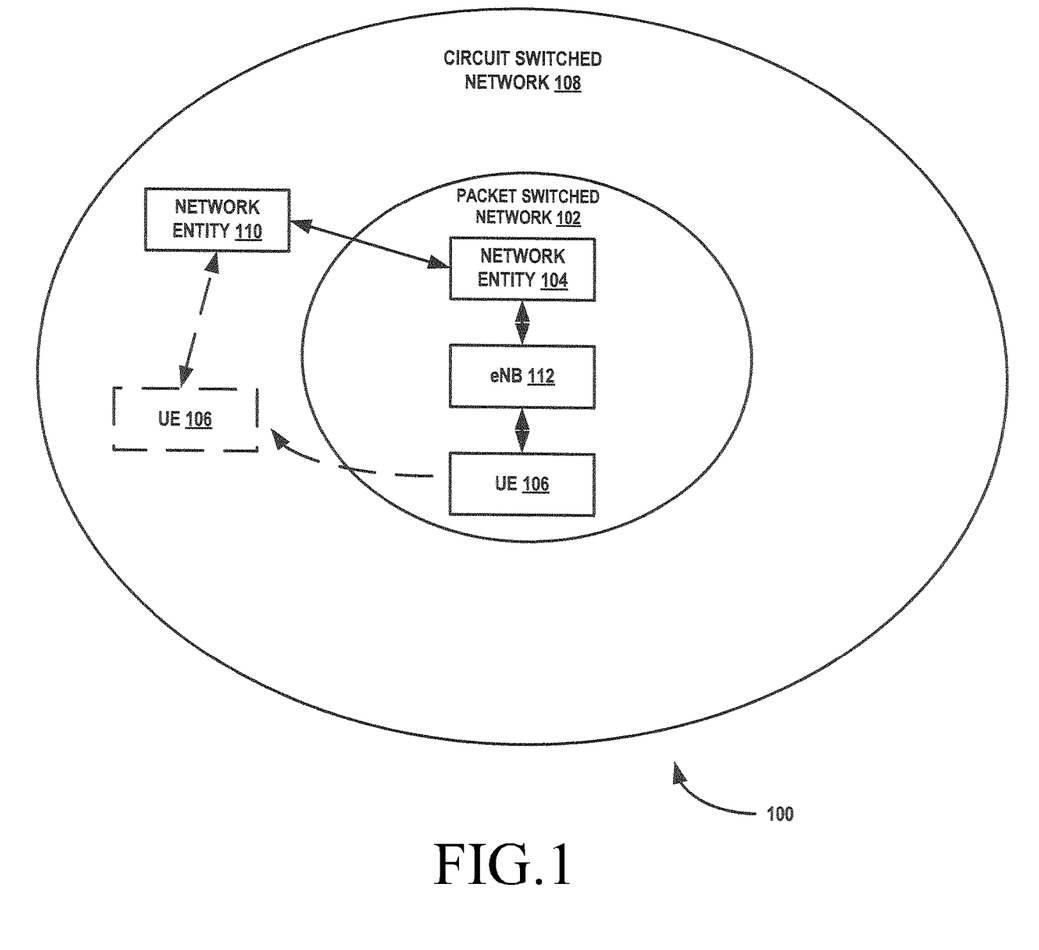
FIG. 1 is a block diagram of a wireless communication system for performing handover of video calls from a packet switched network to a circuit switched network, according to an embodiment of the present invention.

FIG. 1 is a block diagram of a wireless communication system 100 for performing handover of video calls from a packet switched network to a circuit switched network, according to an embodiment of the present invention. In FIG. 1, the wireless communication system 100 includes a packet switched network 102 having a network entity (Mobility Management Entity (MME)/SGSN) 104 (e.g. an MME in LTE networks, a serving general packet radio service (GPRS) node in the case of 3G plus network, etc.) and a user equipment (UE) 106 communicatively connected to the network entity 104. The wireless communication system 100 also includes the circuit switched network 108 having a network entity (MSC) 110.

As can be seen, the packet switched network 102 overlaps parts of the circuit switched network 108. In consideration of this, the UE 106 has a video call session through the network entity 104 of the packet switched network 102. When the UE 106 moves from the packet switched network 102 to the circuit switched network 108, a handover of the video call from the packet switched network 102 to the circuit switched network has to be performed. The below description is described with reference to FIGS. 1 and 2.

Figure 2:
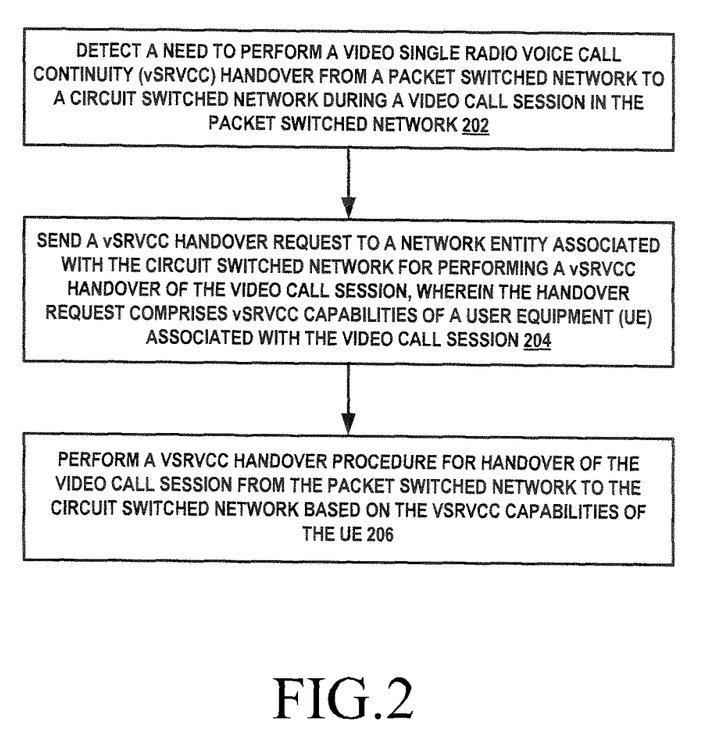
FIG. 2 is a flowchart illustrating a method of performing handover video call sessions from the packet switched network to the circuit switched network, according to an embodiment of the present invention.

In an embodiment of the present invention, an eNB 112 connected to the UE 106 detects a need to perform a video single radio voice call continuity (vSRVCC) handover from the packet switched network 102 to the circuit switched network 108 during the video call session (as in step 202 of FIG. 2). The term 'video call session' refers to an ongoing video call or a video call in alerting state for notifying a reception of a call. For example, the eNB 112 detects a need to perform a vSRVCC handover based on parameters in measurement reports received from the UE 106. The eNB 112 then communicates the need to perform the vSRVCC handover procedure to the network entity 104.

Accordingly, the network entity 104 sends a vSRVCC handover request to the network entity 110 for performing a vSRVCC handover of the video call session (as in step 204 of FIG. 2). Examples of a vSRVCC handover request is given in Table 1 below. In some embodiments, the network entity 104 communicates the vSRVCC capabilities of the UE 106 associated with the video call session to the network entity 104 in the vSRVCC handover request. The vSRVCC capabilities include a service change and unrestricted digital information fallback (SCUDIF) capabilities, a first set of bearer capabilities, a second set of bearer capabilities, and bearer capability elements associated with the UE 106. The SCUDIF capabilities indicate support for user initiated service change and fallback or network initiated in-call modification (ICM). Examples of vSRVCC capabilities of the UE 106 are given in Table 2 below. In these embodiments, the UE 102 shares the vSRVCC capabilities with the eNB 112 during an initial attach procedure with the network entity 104.

TABLE 1

| Information elements | P | Condition/Comment | IE Type | Ins. |
| --- | --- | --- | --- | --- |
| IMSI | C | This IE shall be included in the message except for the cases:<br>The UE is emergency attached and it is UICCless<br>The UE is emergency attached and the IMSI is not authenticated | IMSI | 0 |
| ME Identity (MEI) | C | This IE shall be included in the message if UE is emergency attached. | MEI | 0 |
| Sv Flags | C | The following flags are applicable:<br>EmInd: this flag shall be sent if this session is for an emergency call.<br>ICS: this flag shall be sent to request IMS Centralized Service support.<br>Video SRVCC capability: This 2 bits flag indicates the UE capability regarding SCUDIF | Sv Flags | 0 |
| MME/SGSN Sv Address for Control Plane | M | This IE specifies the address for control plane message which is chosen by the source MME/SGSN | IP-Address | 0 |
| MME/SGSN Sv TEID for Control Plane | M | This IE specifies the tunnel for control plane message which is chosen by the source MME/SGSN. The target MM shall include this TEID in the GTP header of all related control plane messages which are related to the requested bearer. | TEID-C | 0 |
| C-MSISDN | C | The MME/SGSN shall include C-MSISDN IE in the message except for the cases: | MSISDN | 0 |

TABLE 1-continued

| Information elements | P | Condition/Comment | IE Type | Ins. |
|---|---|---|---|---|
| | | The UE is emergency attached and it is UICCless | | |
| | | The UE is emergency attached and the IMSI is not authenticated | | |
| | | The C-MSISDN is defined in 3GPP TS 23.003 [4]. | | |
| STN-SR | C | The MME/SGSN shall include STN-SR IE if this session is not for an emergency call. | STN-SR | 0 |
| MM Context for E-UTRAN SRVCC | C | The MME shall include mobile station classmarks, supported codecs, and CS Security key in MM Context for SRVCC for E-UTRAN SRVCC. The derivation of the CS security keys shall follow the procedures defined 3GPP TS 33.401 [7]. | MM Context for E-UTRAN SRVCC | 0 |
| MM Context for UTRAN SRVCC | C | The SGSN shall include mobile station classmarks, supported codecs, and CS Security key in MM Context for SRVCC for UTRAN (HSPA) SRVCC. The derivation of the CS security keys shall follow the procedures defined 3GPP TS 33.102 [10]. | MM Context for UTRAN SRVCC | 0 |
| Source to Target Transparent Container | M | The MME or SGSN shall include Source to Target Transparent Container IE | Source to Target Transparent Container IE | 0 |
| Target RNC ID | C | This IE shall be used to identify the target access for SRVCC handover to UTRAN (note 1). | Target RNC ID | 0 |
| Target Cell ID | C | This IE shall be used to identify the target access for SRVCC handover to GERAN (note 1). | Target Global Cell ID | 0 |
| Private Extension Video SRVCC capability | O | None | Private Extension | VS |

NOTE 1:
Based upon the SRVCC Handover procedure, either Target RNC ID or Target Cell ID shall be present in this message

TABLE 2

```
<MS network capability value part> ::=
  <GEA1 bits>
  <SM capabilities via dedicated channels: bit>
  <SM capabilities via GPRS channels: bit>
    <UCS2 support. bit>
  <SS Screening indicator: bit string(2)>
  <SoL3A Capability : bit>
  <Revision level indicator: bit>
  <PFC feature mode: bit>
  <Extended GFA bits>
  <LCS VA capability: bit>
  <PS inter-RAT HO to UTRAN Iu mode capability: bit>
  <PS inter-RAT HO to E-UTRAN S1 mode capability: bit>
  <CSFB Capability: bit>
  <ISR support: bit>
  <SRVCC to GERAN/UTRAN capability: bit>
  <EPC capability: bit>
  <Selective camping capability. bit>
  <NF capability: bit>
  <Video SRVCC capability: bit string (2)>
  <Spare bits>;
<GEA1 bits> ::= < GEA/1 :bit>;
<Extended GEA bits> ::= <GEA/2:bit><GEA/3:bit>< GEA/4:bit >< GEA/5:bit >< GEA/6:bit ><GEA/7:bit>;
<Spare bits> ::= null | {<spare bit> < Spare bits >};
SS Screening Indicator
  0 0  defined in 3GPP TS 24.080 [24]
  0 1  defined in 3GPP TS 24.080 [24]
  1 0  defined in 3GPP TS 24.080 [24]
  1 1  defined in 3GPP TS 24.080 [24]
SM capabilities via dedicated channels
  0  Mobile station does not support mobile terminated point to point SMS via CS domain
  1  Mobile station supports mobile terminated point to point SMS via CS domain
SM capabilities via GPRS channels
  0  Mobile station does not support mobile terminated point to point SMS via PS domain
  1  Mobile station supports mobile terminated point to point SMS via PS domain
UCS2 support
This information field indicates the likely treatment by the mobile station of UCS2 encoded character strings.
  0  the ME has a preference for the default alphabet (defined in 3GPP TS 23.030 [8b])
     over UCS2.
  1  the ME has no preference between the use of the default alphabet and the
     use of UCS2.
```

TABLE 2-continued

GPRS Encryption Algorithm GEA/1
   0   encryption algorithm GEA/1not available
   1   encryption algorithm GEA/1 available
SoLSA Capability
   0   The ME does not support SoLSA.
   1   The ME supports SoLSA.
Revision level indicator
   0   used by a mobile station not supporting R99 or later versions of the protocol
   6   used by a mobile station supporting R99 or later versions of the protocol
PFC feature mode
   0   Mobile station does not support BSS packet flow procedures
   1   Mobile station does support BSS packet flow procedures
GEA/2
   0   encryption algorithm GEA/2 not available
   1   encryption algorithm GEA/2 available
GEA/3
   0   encryption algorithm GEA/3 not available
   1   encryption algorithm GEA/3 available
GEA/4
   0   encryption algorithm GEA/4 not available
   1   encryption algorithm GEA/4 available
GEA/5
   0   encryption algorithm GEA/5 not available
   1   encryption algorithm GEA/5 available
GEA/6
   0   encryption algorithm GEA/6 not available
   1   encryption algorithm GEA/6 available
GEA/7
   0   encryption algorithm GEN/7 not available
   1   encryption algorithm GEA/7 available
LCS VA capability (LCS value added location request notification capability)
This information field indicates the support of the LCS value added location request notification via PS
domain as defined in 3GPP TS 23.271 [105].
   0   location request notification via PS domain not supported
   1   location request notification via PS domain supported
PS inter-RAT HO to UTRAN Iu mode capability
This information field indicates the support of the PS inter-RAT HO to UTRAN Iu mode.
   0   PS inter-RAT HO to UTRAN Iu mode not supported
   1   PS inter-RAT HO to UTRAN Iu mode supported
PS inter-RAT HO to E-UTRAN S1 mode capability
This information field indicates the support of the PS inter-RAT HO to E-UTRAN S1 mode.
   0   PS inter-RAT HO to E-UTRAN S1 mode not supported
   1   PS inter-RAT HO to E-UTRAN S1 mode supported
CSFB capability
This information field indicates the support of the CS fallback.
   0   Mobile station does not support CS fallback
   1   Mobile station supports CS fallback
ISR support
   0   The mobile station does not support ISR.
   1   The mobile station supports ISR.
SRVCC to GERAN/UTRAN capability
   0   SRVCC from UTRAN HSPA or E-UTRAN to GERAN/UTRAN not supported
   1   SRVCC from UTRAN HSPA or E-UTRAN to GERAN/UTRAN supported
EPC capability
This information field indicates if the MS supports access to the EPC via access networks other than
GERAN or UTRAN.The network can use this information to decide whether to select a PDN Gateway or a
GGSN. The MS shall set the indication to "0" if a SIM is inserted in the MS.
   0   EPC not supported
   1   EPC supported
NF capability
This information field indicates if the MS supports the notification procedure.
   0   Mobile station does not support the notification procedure.
   1   Mobile station supports the notification procedure.
Selective camping capability
This information field indicates whether the MS supports the Selective camping capability which allows the
MS to send to the network the UE's usage setting and the Voice domain preference. The use of this
information is only for input to selection of camping strategies for the MS. Based on operator policy the
network can ignore the Selective camping capability when the UE is registered in a VPLMN.
   0   Selective camping capability not supported
   1   Selective camping capability supported
Video SRVCC from UTRAN HSPA or E-UTRAN to UTRAN CS capability
  0 0  SRVCC from UTRAN HSPA or E-UTRAN to UTRAN CS not supported
  0 1  SRVCC from UTRAN HSPA or E-UTRAN to UTRAN CS supported with support of
       service change and fallback
  1 0  SRVCC from UTRAN HSPA or E-UTRAN to UTRAN CS supported with enhanced
       network initiated ICM
  1 1  SRVCC from UTRAN HSPA or E-UTRAN to UTRAN CS supported with support of
       service change and fallback and enhanced network initiated ICM In one embodiment, the eNB 112 shares the SCUDIF capabilities with the network entity 104 during the initial attach procedure itself. The network entity 104 then stores the SCUDIF capabilities in its memory. It can be noted that the eNB 112 communicates the first and second sets of bearer capabilities and bearer capability elements to the network entity 104 while communicating a need for performing a vSRVCC handover procedure. Upon receiving the vSRVCC handover request, the network entity 110 performs a vSRVCC handover procedure to handover the video call session from the packet switched network 102 to the circuit switched network 108 based on the vSRVCC capabilities of the UE 106 (as in step 206 of FIG. 2). The process of performing the vSRVCC handover procedure is explained in greater detail with respect to FIG. 3.

Figure 3:
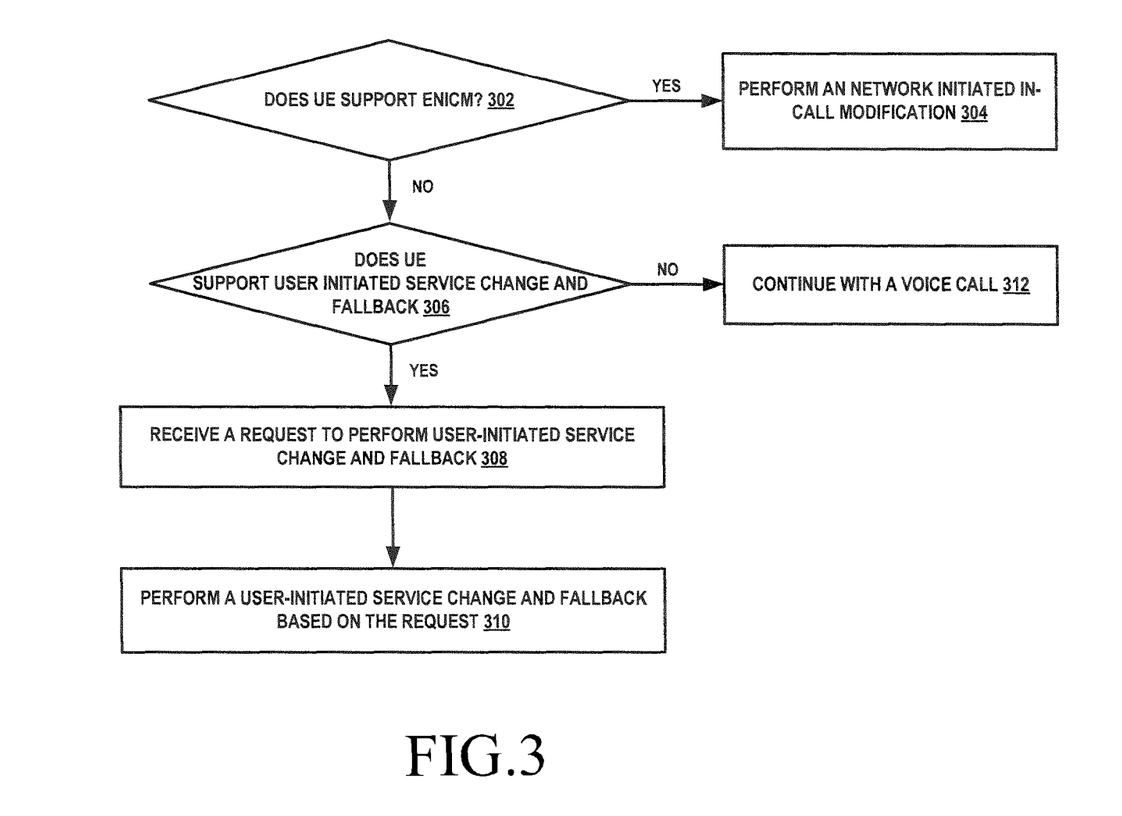
FIG. 3 is a flowchart illustrating a method of performing the video single radio voice call continuity (vSRVCC) handover procedure based on the vSRVCC capabilities of user equipment, according to an embodiment of the present invention.

FIG. 3 is a flowchart 300 illustrating a method of performing the vSRVCC handover procedure based on the vSRVCC capabilities of the UE 106, according to an embodiment of the present invention. When the vSRVCC handover request is received from the network entity 104, it is determined whether the UE 106 supports a network initiated in-call modification and services corresponding to the first set of bearer capabilities and the second set of bearer capabilities based on the vSRVCC capabilities in the vSRVCC handover request, at step 302.

If the UE 106 supports the network initiated in-call modification procedure, then at step 304, the network initiated in-call modification procedure for handover of the video call session from the packet switched network to the circuit switched network is performed. In an embodiment of the present invention, an SRVCC handover procedure for establishing a voice call session associated with the video call session is performed. Then, a video component is added to the established voice call session by performing the network initiated in-call modification procedure to complete the voice and video SRVCC handover.

If the UE 106 does not support the network initiated in-call modification procedure, then it is determined whether the UE 106 supports a user-initiated service change and fallback and services corresponding to the first set of bearer capabilities and the second set of bearer capabilities based on the vSRVCC capabilities in the vSRVCC handover request, at step 306. If the UE 106 supports user-initiated service change and fallback, then at step 308, a request to perform the user-initiated service change and fallback procedure is received from the UE 106.

At step 310, the user initiated service change and fallback procedure is performed based on the received request. In an embodiment of the present invention, a SRVCC handover procedure for establishing a voice call session associated with the video call session is performed based on the received request. Then, a video component is added to the already established voice call session by performing the user-initiated service change and fallback procedure. If the UE 106 does not support user-initiated service change and fallback, then at step 312, the ongoing voice call associated with the UE 106 is continued based on the vSRVCC capabilities without adding the video media component to the ongoing voice call.

In accordance with the embodiments described above, the present invention includes OEs that indicate to MME/SGSN 104, capability of the UE 106 with respect to supporting user-initiated and/or network-initiated SCUDIF.

The MME/SGSN 104 can then later (at the time of the SRVCC handover) pass the relevant information related to the SRVCC for video capability with respect to vSRVCC capabilities through an Sv interface to the MSC 110 in order to determine the right course of action for the handling of the handed over session.

In order for the MSC 110 to execute SCUDIF based network initiated in call modification procedure, it needs to know the bearer capabilities BC1 and BC2 which are provided by the UE preferred service and BC2 defines a less preferred service. At call setup the required call type, 3G-324M, is indicated by the originating UE in the SETUP message with the bearer capability IE parameter with other Rate Adaptation set to "11.223 and H.245". The MSC 110 converts the elements into the basic services subscribed by the UE 106 and checks these values against the UE 106 subscription. Based on the response from a Home Subscriber Server (HSS), the MSC 110 may either proceed with the call or drop it. For the SRVCC handover procedure, since the UE doesn't send the SETUP message towards the MSC 110, the MSC 110 is unaware of BC1 and BC2.

The following methods can be used for resolving this issue:

1. Statically configuring the elements BC1 and BC2 at the MSC 110 for vSRVCC capable UEs.
    a. The elements BC1 and BC2 will be statically configured at the MSC and the MSC uses these statically configured values during the vSRVCC handover procedures.
2. To be transferred during video SRVCC handover via the MME 104
    a. The eNodeB provides the capability elements BC1 and BC2 to the MME 106 in the handover request. The MME 104 then provides these to the MSC 110 in the vSRVCC handover request over Sv interface during the SRVCC handover procedure.
3. Using SIP procedures The UE provides BC1 and BC2 to the SCC AS as SDP extensions in the SIP INVITE during the session establishment procedures. The SCC AS provides the BC1 and BC2 information to the MSC 110 as a part of the session transfer procedure using the provisional responses or subscription to the dialog event package.

When the MSC 110 receives the Sv request from the MME/SGSN 104 and the value of the IE is other than 00 (i.e. Video SRVCC is supported), alternative Radio Access Bearer (RAB) parameters IE in the RANAP Relocation Request message indicating the RAB configuration for multimedia in addition to the RAB configuration for speech. The MSC 110 then decides based on the logic indicated in whether to initiate enhanced network initiated ICM procedures, wait for user-initiated service change and fallback or follow up with "existing" SRVCC procedures.

The embodiments of the present invention have been described with reference to specific example embodiments, and it will be evident that various modifications and changes may be made to these embodiments without departing from the broader spirit and scope of the various embodiments. Furthermore, the various devices, modules, selectors, estimators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structures and methods may be embodied using transistors, logic gates, and electrical circuits, such as application specific integrated circuits.

The invention claimed is:

1. A method for performing a handover of a video call from a packet switched network to a circuit switched network by a mobility management entity (MME) in a wireless network environment, the method comprising:
   receiving, by the MME, a message from an e-node B (eNB) to perform a video single radio voice call continuity (vSRVCC) handover for a User Equipment (UE) from the packet switched network to the circuit switched network during a video call session in the packet switched network; and
   transmitting, by the MME, a vSRVCC handover request to a circuit switched network entity for performing the vSRVCC handover of the video call session;
   wherein the vSRVCC handover request comprises Sv flags including vSRVCC capabilities of the UE-associated with the video call session, and
   wherein the vSRVCC capabilities indicate that the vSRVCC handover is requested by the MME.

2. The method of claim 1, wherein the vSRVCC capabilities of the UE are acquired by the eNB during an initial attach procedure with the UE, and are stored in a memory of the eNB.

3. An apparatus for performing a handover of a video call from a packet switched network to a circuit switched network by a mobility management entity (MME) in a wireless network environment, the apparatus comprising:
   a transceiver for receiving a message from an e-node B (eNB) to perform a video single radio voice call continuity (vSRVCC) handover for a User Equipment (UE) from the packet switched network to the circuit switched network during a video call session in the packet switched network and transmitting a vSRVCC handover request to a circuit switched network entity for performing the vSRVCC handover of the video call session; and
   a controller for controlling the transceiver,
   wherein the vSRVCC handover request comprises Sv flags including vSRVCC capabilities of the UE associated with the video call session, and
   wherein the vSRVCC capabilities indicates that the vSRVCC handover is requested by the MME.

4. The apparatus of claim 3, wherein the vSRVCC capabilities of the UE are acquired by the eNB during an initial attach procedure with the UE, and are stored in a memory of the eNB.

5. A method for performing a handover of a video call from a packet switched network to a circuit switched network by a circuit switched network entity in a wireless network environment, the method comprising:
   receiving, from a mobility management entity (MME), a video single radio voice call continuity (vSRVCC) handover request for performing a vSRVCC handover for a user equipment (UE) of a video call session in the packet switched network, wherein the vSRVCC handover request comprises Sv flags including vSRVCC capabilities of the UE associated with the video call session; and
   performing the vSRVCC handover based on the vSRVCC capabilities of the UE,
   wherein the vSRVCC capabilities indicate that the vSRVCC handover is requested by the MME.

6. The method of claim 5, wherein the vSRVCC capabilities comprise a first set of bearer capabilities, a second set of bearer capabilities, and bearer capability elements, and wherein performing the vSRVCC handover based on the vSRVCC capabilities comprises:
   determining whether the UE supports the network initiated in-call modification and services corresponding to the first set of bearer capabilities and the second set of bearer capabilities based on the vSRVCC capabilities of the UE;
   if the UE supports the network initiated in-call modification and services, performing the network initiated in-call modification for handover of the video call session from the packet switched network to the circuit switched network; and
   if the UE does not support the network initiated in-call modification and services, determining whether the UE supports the user-initiated service change and fallback and services corresponding to the first set of bearer capabilities and the second set of bearer capabilities based on the vSRVCC capabilities of the UE.

7. The method of claim 6, wherein determining whether the UE supports the user-initiated service change and fallback and the services comprises:
   if the UE supports the network initiated in-call modification and services, receiving a request to perform the user-initiated service change and fallback procedure from the UE and performing the user initiated service change and fallback procedure based on the received request; and
   if the UE does not support the network initiated in-call modification and services, continuing the ongoing voice call associated with the UE based on the vSRVCC capabilities of the UE.

8. The method of claim 7, wherein performing the network initiated in-call modification for handover of the video call session from the packet switched network to the circuit switched network comprises:
   performing an SRVCC handover procedure for establishing a voice call session associated with the video call session; and
   adding a video component to the established voice call session by performing the network initiated in-call modification procedure,
   wherein performing the user initiated service change and fallback procedure based on the received request comprises:
   performing an SRVCC handover procedure for establishing a voice call session associated with the video call session based on the received request; and
   adding a video component to the established voice call session by performing the user- initiated service change and fallback procedure.

9. An apparatus for performing a handover of a video call from a packet switched network to a circuit switched network by a circuit switched network entity in a wireless network environment, the apparatus comprising:
   a receiver for receiving, from a mobility management entity (MME), a video single radio voice call continuity (vSRVCC) handover request for performing a vSRVCC handover for a user equipment (UE) of a video call session in the packet switched network, wherein the vSRVCC handover request comprises Sv flags including vSRVCC capabilities of the UE associated with the video call session; and
   a controller for performing the vSRVCC handover based on the vSRVCC capabilities of the UE,
   wherein the vSRVCC capabilities indicate that the vSRVCC handover is requested by the MME.

10. The apparatus of claim 9, wherein the vSRVCC capabilities comprises a first set of bearer capabilities, a second set of bearer capabilities, and bearer capability elements, and
 wherein, in performing the vSRVCC handover based on the vSRVCC capabilities, the controller determines whether the UE supports the network initiated in-call modification and services corresponding to the first set of bearer capabilities and the second set of bearer capabilities based on the vSRVCC capabilities of the UE, and, if so, performs the network initiated in-call modification procedure for handover of the video call session from the packet switched network to the circuit switched network, and, if not, determines whether the UE supports the user-initiated service change and fallback and services corresponding to the first set of bearer capabilities and the second set of bearer capabilities based on the vSRVCC capabilities of the UE.

11. The apparatus of claim 10, wherein in determining whether the UE supports the user-initiated service change and fallback, and the services corresponding to the first set of bearer capabilities and the second set of bearer capabilities based on the vSRVCC capabilities in the vSRVCC handover request, if the UE supports the network initiated in-call modification and services, the circuit switched network entity controller controls to the receiver for receiving a request to perform the user-initiated service change and fallback procedure from the UE and performs the user initiated service change and fallback procedure based on the received request, and, if the UE does not support the network initiated in-call modification and services, the controller continues the ongoing voice call associated with the UE based on the vSRVCC capabilities of the UE.

12. The apparatus of claim 11, wherein, in performing the network initiated in-call modification procedure for handover of the video call session from the packet switched network to the circuit switched network, the controller performs an SRVCC handover procedure for establishing a voice call session associated with the video call session, and adds a video component to the established voice call session by performing the network initiated in-call modification procedure, and
 wherein, in performing the user initiated service change and fallback procedure based on the received request, the controller performs an SRVCC handover procedure for establishing a voice call session associated with the video call session based on the received request, and adds a video component to the established voice call session by performing the user-initiated service change and fallback procedure.

* * * * *